United States Patent
Pothoven et al.

(10) Patent No.: US 8,814,620 B2
(45) Date of Patent: Aug. 26, 2014

(54) CRUCIBLE STRUCTURE FOR PLASMA LIGHT SOURCE AND MANUFACTURING METHOD

(71) Applicants: Floyd R. Pothoven, Lakewood, CA (US); Andrew Simon Neate, Buckinghamshire (GB); Martyn Roscoe, Leicestershire (GB); Barry Preston, Leicestershire (GB)

(72) Inventors: Floyd R. Pothoven, Lakewood, CA (US); Andrew Simon Neate, Buckinghamshire (GB); Martyn Roscoe, Leicestershire (GB); Barry Preston, Leicestershire (GB)

(73) Assignee: Ceravision Limited, Milton Keynes (GB)

( * ) Notice: Subject to any disclaimer, the term of this patent is extended or adjusted under 35 U.S.C. 154(b) by 0 days.

(21) Appl. No.: 13/623,007

(22) Filed: Sep. 19, 2012

(65) Prior Publication Data
US 2014/0077693 A1   Mar. 20, 2014

(51) Int. Cl.
*H01J 9/00* (2006.01)
*H01J 9/20* (2006.01)
*B32B 33/00* (2006.01)
*H01J 61/30* (2006.01)

(52) U.S. Cl.
CPC *B32B 33/00* (2013.01); *H01J 61/30* (2013.01)
USPC ............... 445/22; 445/26; 445/27; 313/634; 313/567; 313/231.71; 313/325

(58) Field of Classification Search
CPC ............ H01J 37/32192; H01J 37/32201; H01J 37/32229; H01J 37/32357; H01J 37/32366; H01J 37/32394; H01J 37/32403; H01J 27/16; H01J 27/18; H01J 65/00; H01J 65/04; H01J 65/042; H01J 65/044; H01J 61/302; H01J 61/361; H01J 61/30; H01J 9/247; H01J 9/323; H01J 9/326; H01J 9/38; C04B 2235/94; C04B 35/10; C04B 35/115; C04B 35/14; C04B 35/64; H01K 3/00; H01K 3/20; H01K 3/22
USPC ............ 313/567, 231.71, 231.61, 325; 313/634–635, 313, 607; 315/34, 111.21, 315/248, 39; 333/208, 202; 445/26–27, 22, 445/58

See application file for complete search history.

(56) References Cited

U.S. PATENT DOCUMENTS

| | | | |
|---|---|---|---|
| 7,701,143 B2 * | 4/2010 | DeVincentis | 315/39 |
| 8,063,565 B2 * | 11/2011 | Hafidi et al. | 313/635 |
| 8,188,662 B2 * | 5/2012 | Hafidi et al. | 313/607 |
| 8,319,439 B2 * | 11/2012 | Hollingsworth et al. | 315/149 |
| 2007/0171006 A1 * | 7/2007 | DeVincentis | 333/239 |
| 2007/0222352 A1 * | 9/2007 | DeVincentis et al. | 313/231.71 |
| 2011/0221326 A1 * | 9/2011 | Preston | 313/113 |

* cited by examiner

*Primary Examiner* — Mariceli Santiago
*Assistant Examiner* — Jose M Diaz
(74) *Attorney, Agent, or Firm* — Bay State IP, LLC

(57) ABSTRACT

Operation to produce an intermediate product for a crucible for a LUWPL is as follows:
a) a body 2 is preheated and placed on a support, with its bore concentric with a tube 4 supported in a chuck and connected to a inflation means;
b) the tube is heated with the chuck being rotated for evenness of heating;
c) when the temperature of the tube is detected to be the softening point of the quartz of the tube, its rotation is stopped and it is advanced into a bore 3 in the body 2;
d) advance is stopped when the distal, sealed end is detected to have reached a determined protrusion 18;
e) simultaneously with the advance being stopped, inflation gas is admitted into the tube, to inflate it albeit it marginally, and bring its outer surface 5 into intimate contact with the surface 6 of the bore 4.

24 Claims, 3 Drawing Sheets

CRUCIBLE STRUCTURE FOR PLASMA LIGHT SOURCE AND MANUFACTURING METHOD

BACKGROUND OF THE INVENTION

1. Field of the Invention

The present invention relates to a crucible for a LUWPL, that is a Lucent waveguide Plasma Light source.

2. Description of the Related Art

In European Patent No EP1307899, granted in our name there is claimed a light source comprising a waveguide configured to be connected to an energy source and for receiving electromagnetic energy, and a bulb coupled to the waveguide and containing a gas-fill that emits light when receiving the electromagnetic energy from the waveguide, characterized in that:

(a) the waveguide comprises a body consisting essentially of a dielectric material having a dielectric constant greater than 2, a loss tangent less than 0.01, and a DC breakdown threshold greater than 200 kilovolts/inch, 1 inch being 2.54 cm, (b) the wave guide is of a size and shape capable of supporting at least one electric field maximum within the wave guide body at at least one operating frequency within the range of 0.5 to 30 GHz, (c) a cavity depends from a first side of the waveguide, (d) the bulb is positioned in the cavity at a location where there is an electric field maximum during operation, the gas-fill forming a light emitting plasma when receiving microwave energy from the resonating waveguide body, and (e) a microwave feed positioned within the waveguide body is adapted to receive microwave energy from the energy source and is in intimate contact with the waveguide body.

In our European Patent No 2,188,829 there is described and claimed a light source to be powered by microwave energy, the source having:

a body having a sealed void therein, a microwave-enclosing Faraday cage surrounding the body, the body within the Faraday cage being a resonant waveguide, a fill in the void of material excitable by microwave energy to form a light emitting plasma therein, and an antenna arranged within the body for transmitting plasma-inducing, microwave energy to the fill, the antenna having:

a connection extending outside the body for coupling to a source of microwave energy;

wherein:

the body is a solid plasma crucible of material which is lucent for exit or light therefrom, and the Faraday cage is at least partially light transmitting for light exit from the plasma crucible, the arrangement being such that light from a plasma in the void can pass through the plasma crucible and radiate from it via the cage.

We refer to this as our Light Emitting Resonator or LER patent. Its main claim as immediately above is based, as regards its prior art portion, on the disclosure of our EP1307899, first above.

In our European Patent Application No 08875663.0, published under No WO2010055275, there is described and claimed a light source comprising:

a lucent waveguide of solid dielectric material having:

an at least partially light transmitting Faraday cage surrounding the waveguide, the Faraday cage being adapted for light transmission radially.

a bulb cavity within the waveguide and the Faraday cage and an antenna re-entrant within the waveguide and the Faraday cage and a bulb having a microwave excitable fill, the bulb being received in the bulb cavity.

We refer to this as our Clam Shell application, in that the lucent wave guide forms a clam shell around the bulb.

As used in our LER patent, our Clam Shell application and this specification:

"microwave" is not intended to refer to a precise frequency range. We use "microwave" to mean the three order of magnitude range from around 300 Mfl/to around 300 GHz;

"lucent" means that the material, of which an item described as lucent is comprised, is transparent or translucent;

"plasma crucible" means a closed body enclosing a plasma, the latter being in the void [in the body] when the void's fill is excited by microwave energy from the antenna;

"Faraday cage" means an electrically conductive enclosure of electromagnetic radiation, which is at least substantially impermeable to electromagnetic waves at the operating, i.e. microwave, frequencies.

The LER patent, the Clam Shell Application and certain LER improvement applications have in common that they are in respect of:

A microwave plasma light source having:
  a Faraday cage:
    delimiting a waveguide and
    being at least partially lucent, and normally at least partially transparent for light emission from it and normally having a non-lucent closure:
  a body of solid-dielectric, lucent material embodying the waveguide within the Faraday cage;
  a closed void in the waveguide containing microwave excitable material; and
  provision for introducing plasma exciting microwaves into the waveguide:
the arrangement being such that on introduction of microwaves of a determined frequency a plasma is established in the void and light is emitted via the Faraday cage.

In our patent application No. PCT/GB2011/001744 (our '744 Application), we defined an LUWPL as follows:
A microwave plasma light source having:
  a fabrication of solid-dielectric, lucent material, having;
  a closed void containing electro-magnetic wave, normally microwave excitable material; and
  a Faraday cage:
  delimiting a wave guide,
  being at least partially lucent, and normally at least partially transparent, for light emission from it,
  normally having a non-lucent closure and
  enclosing the fabrication;
  provision for introducing plasma exciting electro-magnetic waves, normally microwaves, into the waveguide;

the arrangement being such that on introduction of electromagnetic waves, normally microwaves, of a determined frequency a plasma is established in the void and light is emitted via the Faraday cage.

In the preferred embodiment of our LER patent, the void is formed directly in the lucent waveguide, which is generally a quartz body. This exposes the quart material to high temperatures by radiation from the plasma and conduction from the gases surrounding the plasma. It is because of this exposure that the term "solid plasma crucible" is used in the LER patent, a crucible being a container for high temperature material. This exposure can result in problems if the plasma causes micro-cracking of the material of the crucible, which then propagate through it.

In our Clam Shell application, this problem is not so apparent in that a quartz bulb having the void and excitable material is provided distinct from and inserted into the lucent wave guide. The waveguide may be formed of two halves captivating the bulb between them or a single body having a bore in which the bulb is received.

SUMMARY OF THE INVENTION

The object of the present invention is to provide a crucible for a LUWPL of the LER type.

According to a first aspect of the invention there is provided a crucible for a LUWPL, the crucible comprising:
 a waveguide body of lucent material having a bore;
 a tube of lucent material is provided in the bore, the tube:
  being closed at both ends,
   containing the excitable material in a void formed in its bore between its sealed ends and
   being in intimate contact with the lucent material of the body.

According to a second aspect of the invention there is provided an intermediate product in the manufacture of the crucible of the first aspect, the intermediate product comprising:
 a waveguide body of lucent material having a bore and
 a tube of lucent material provided in the bore in intimate contact with the lucent material of the body.

Normally the waveguide body will be of fused quartz and the tube will be of drawn fused quartz tube, free from microcracks inherent in the machining of the bore in the body. Hereinbelow, the term "quartz" is used to indicate "fused quartz".

In use of the crucible of the invention, the bore is protected from the action of the plasma gases and the intensity of heat inherent in bordering a plasma containing void. Intimacy of contact in the bore between the tube and the body can be expected to allow continuity of thermal and electrical properties throughout the crucible, for instance in conduction of heat from the bore-albeit that quartz, the preferred material, is a poor conductor of heat which is advantageous in allowing the void region of the crucible to run hot.

Normally the lucent material of the tube will be the same or at least substantially similar to that of the body. By substantially similar is intended that one or other material may include additives such as to change its optical transmissivity and/or its dielectric constant.

Whereas in metalworking arts, intimate contact can be achieved either by thermal expansion/contraction of parts or by pressing of parts together, pressing is liable to shatter quartz parts.

According to a third aspect of the invention there is provided a method in the manufacture of the crucible of the first aspect including the steps of:
 providing a lucent waveguide body with a bore therein:
 inserting a lucent tube in the bore; and
 causing the tube to expand and/or the body to contract to bring the tube and the body into intimate contact in the bore.

Whilst it is envisaged that the expansion/contraction could be achieved by heating the body and/or cooling the tube prior to insertion of the tube in the bore, it is preferably achieved with quartz tube by:
 heating the tube to its softening prior to insertion and inflating it on insertion.

Whilst it is envisaged that the heated tube could be inserted into a cool lucent waveguide body, we prefer to preheat the body prior to the insertion, whereby the tube does not tend to contract away from body on cooling after inflation.

Whilst the tube can be of plain uniform diameter; we prefer for it to have at least a large diameter portion sized complementarily with the bore and a smaller diameter portion for its sealing to enclosed the excitable material.

Whilst the distal/insert end of the tube can be unsealed on insertion, it is preferably sealed prior to insertion. The bore can be a blind bore, with the scaled end of the tube being inserted as far as the bottom of the bore, the bore is preferably a through bore, with the distal end being inserted to extend to a determined extent.

Preferably, the insertion is as far as a stop on the side of the body opposite from the insertion side. The stop could be a physical stop, which has the advantage or supporting the sealed end of the tube against extension away from the body on inflation. However an optical stop can be used alone or in addition to the physical stop. By optical stop is meant that a light beam is interrupted by the sealed end when the tube is correctly positioned, with the interruption causing an actuator advancing the tube to stop the advance and cause the application of internal pressure in the tube to inflate it. Alternatively other means of detecting that the sealed end of the tube has reached its stop position can be envisaged.

Conveniently, the distal end is inserted through the bore to sufficient extent that immediately beyond the opposite end orifices of the bore, the tube expands to a diameter greater than the bore, outside it, where the tube is not constrained by the bore, whereby the tube is physically restrained against axial movement with respect to the body. For this the tube is heated along a length exceeding the length of the bore.

Alternatively, where the bore is a through bore, the distal end can be inserted to be flush with the side of the body opposite from that at which the tube is inserted into the body.

Preferably the tube is heated whilst being monitored by a thermometer, such as an infra-red detector, whereby the actuator can be caused to advance the tube as soon as the tube has reached a temperature at which it is sufficiently soft to be inflatable, yet still sufficiently rigid to be able to be inserted.

Closure of the proximal end of the tube can be conventional glass working techniques, which can but need not involve upsetting and fusing of the material or the tube with the material of the body. Further, the originally sealed end can be upset into more intimate contact with its side of the body.

The non-sealed end is preferably sealed in two stages, (i.) remotely from the body first after insertion of the excitable material and (ii.) close to the body thereafter with the intervening length of tube being removed.

Preferably, after the insertion of the excitable material and prior to the initial sealing:
 the excitable material is caused to sublime and re-condense within the inflated portion of the tube or in the tube in its extent from the body and volatile impurity introduced with excitable material is evacuated;

excitable material condensed in the tube outside the body is caused to sublime and re-condensed in the inflated tube inside the body or in the initially sealed end thereof prior to final sealing.

BRIEF DESCRIPTION OF THE DRAWINGS

To help understanding of the invention, a specific embodiment thereof will now be described by way of example and with reference to the accompanying drawings, in which.

DETAILED DESCRIPTION OF THE PREFERRED EMBODIMENT

Figure 1:
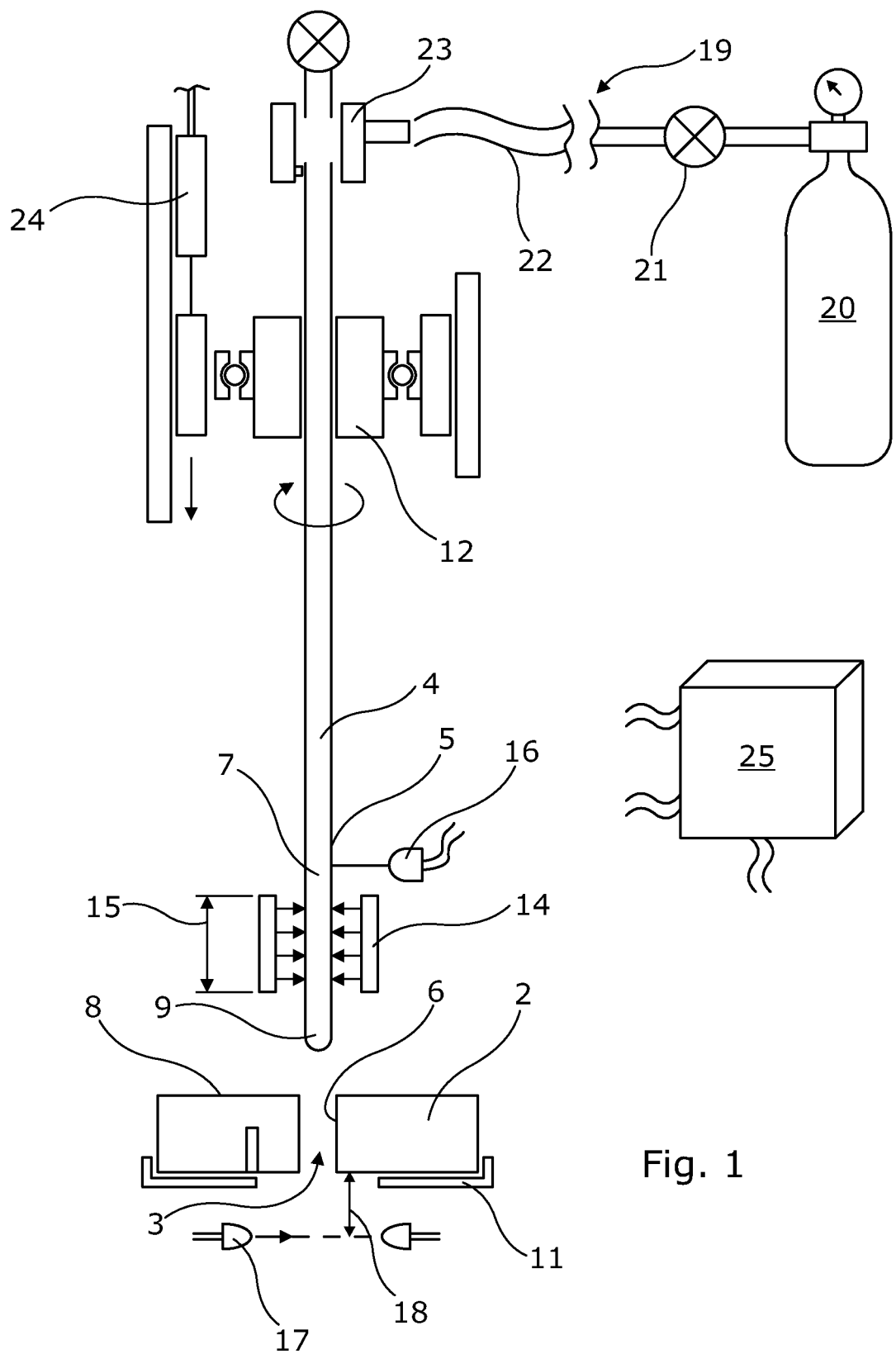
FIG. 1 is a diagrammatic view of apparatus for manufacture of a lucent crucible in accordance with the invention.
Figure 2:
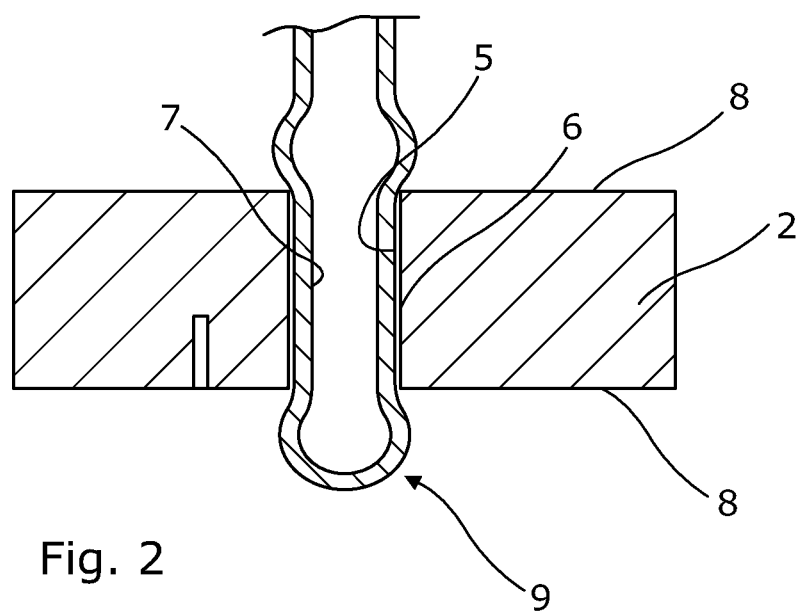
FIG. 2 is a cross-sectional view of an intermediate product in the manufacture of the crucible.
Figure 3:
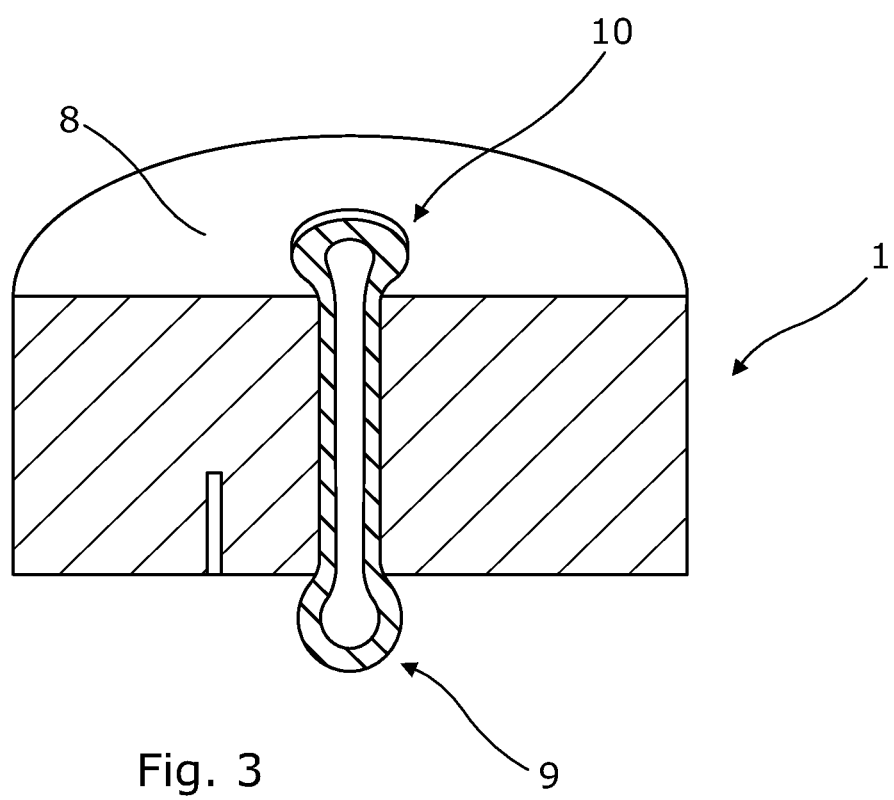
FIG. 3 is a sectional perspective view of the manufactured crucible.

Referring to the drawings, a crucible 1 of the invention is formed from a wave guide body 2 of fused quartz, typically it is 49 mm in diameter and 20 mm long for operation in a Faraday cage closely enclosing it at a microwave resonance of 2.45 GHz. It has a central bore 3 of 6 mm diameter through it, which is polished to optical clarity, but not to the extent of reasonable certainty of removal of all microcracks result from the process of boring. It also has an eccentric bore for receiving an antenna for introducing microwaves.

Received within the central bore is a drawn quartz tube of 1 mm nominal wall thickness, i.e. 6 mm nominal outside diameter, whose outer surface 5 has been brought into intimate contact with the optically clear surface 6 of the bore, whereby crucible has for practical purposes properties as if it were a single piece of quart with the 4 mm bore 7 at the centre of the tube having the surface finish of a drawn tube. We postulate a test of such intimacy of contact as follows, namely slicing the ends off the body say 3 mm from each end face 8, through the tube and the bores referred to. If the tube has been brought into intimate contact, it can be expected to resist pressing from the bore. (It should be noted that we propose alternative crucible structures with the tube not in intimate contact in co-pending applications.)

The ends of the tube are scaled. One end 9 is largely as formed prior to insertion of the tube 4 in the bore 2 and slightly inflated on insertion. The other end 10 has a closure formed, by glass blowing techniques, after the bore was inserted. Inside the scaled tube is a charge of material excitable by microwave energy to form a light emitting plasma on the axis of the tube.

Manufacture of the crucible is performed with equipment including:

a support 11 for a lucent body 2, the body having been bored, possibly polished and pre-heated close to softening temperature but yet not so close as to cause it to lose its shape in movement from a pre-heating oven (not shown) to the support;

a chuck 12 for holding the tube 4, already sealed at its end 9 without any part of the end having a diameter greater than that of the rest of the tube. concentric with the bore 3;

a radiant heater 14 for the extent 15 of the tube, equal to the thickness of the body 1 plus a margin, to be received in the body;

a thermometer 16 for monitoring the temperature to which the tube is heated:

means 17 for optically detecting insertion of the tube through the body to a determined protrusion 18, means 19 for admitting inflation gas to the interior of the tube, the inflation means including:

a pressurised gas source 20, an admission valve 21, a flexible connection 22 allowing advance of the chuck and the tube 4 during its insertion and a rotary connection 23 allowing rotation of the tube 4 during its heating;

means 24 for advancing the chuck and the tube with it;

a controller 25.

Operation of this equipment under the control of the controller 25 is as follows:

a) the body 2 is preheated and placed on the support, with its bore concentric with the tube 4 supported in the chuck and connected to the inflation means:

b) the tube is heated with the chuck being rotated for evenness of heating:

c) when the temperature of the tube is detected to be the softening point of the quart 7 of the tube, its rotation is stopped and it is advanced into the bore 3 in the body 2;

d) advance is stopped when the distal, scaled end is detected to have reached the determined protrusion 18;

e) simultaneously with the advance being stopped, inflation gas is admitted into the tube, to inflate it albeit marginally, and bring the outer surface 5 of the tube into intimate contact with the surface 6 of the bore 4, the inflation also expanding the tube immediately outside the bore, to further assure the fixture of the tube in the bore;

f) the intermediate product so formed is set aside to cool, or allowed to cool partially or indeed, it can be processed further whilst still hot.

The further processing steps are:

g) disconnection of the inflation gas source and connection to a vacuum pump (not shown);

h) evacuation of the tube:

i) insertion of a pellet of excitable material—with the precaution that the intermediate crucible product is not too hot to volatilise the excitable material:

j) admission of the inert gas into the evacuated tube;

k) heating of the tube remote from the body and working of the tube to seal it;

l) heating of the tube close to the body and working it to form a second and final seal close to the body with the seal upset to extend to a greater diameter than the original tube diameter. The intermediate length of the tube between the first and second seals is removed.

The invention is not intended to be restricted to the details of the above described embodiment. Particularly when the tube is arranged to be inserted clown vertically into the lucent body, the chuck may not be rotated, where the heater can be relied upon not to distort the tube in bending. Indeed if such arrangement is used the chuck can be replaced with a simpler clamp.

Further, it is likely that the pellet of excitable material will contain volatile impurities in particular hydrogen iodide, whilst the excitable material itself is solid at room temperature and volatile at higher temperatures than that of the volatile impurities. For removal of the impurities, the pellet is introduced as in step (i.) above when the intermediate crucible product is still above the impurity volatilisation temperature. Alternatively, if the temperature has dropped, heat is applied to the closed end 9 of the tube and the impurity is volatised and evacuated via the tube which is evacuated. If the intermediate product is cool enough the sublimed pellet material will condense in the inflated position of the tube within the lucent body.

2. Alternatively the tube extending from the body can be cooled by applied air flow adjacent the body for re-condensing there. Then the inert gas is introduced as per step (j.) and the remote end of the tube is sealed as in step (k.). The closed end and/or the inflated portion, with the body 2, is cooled. Prior to sealing as in step (l.), at least where the excitable material has condensed in the tube, the latter is heated to re-sublime the material which then re-condenses on the closed end 9 or the inflated portion of the tube within the body. The sealing step (l.) can then be completed as above with the excitable material captivated.

The radiant heater can be an ohmic heater or a gas torch or indeed an inductively heated carbon block.

The optical detection means can be an LED on a photodiode. Alternatively a camera with suitable image recognition software can be used. Again, the detection means can be augmented with a physical stop.

We would normally expect the best optical performance of the light source if the excitable-material/plasma void extends to the full thickness of the body, which involves the stop being spaced from the end face from which the sealed end of the tube extends. Nevertheless, we can envisage that it may be advantageous to provide the stop at the this end face, so that the inflation of the tube is wholly within the bore in the body.

Whilst we believe that best results are likely to be achieved if the surface 6 of the bore is polished to optical clarity: it may be possible to prepare it to a lesser extent, for instance by fine grinding.

As regards the wall thickness of the tube is concerned, we would emphasize that the dimension given of 1 mm is merely exemplary. We expect 1.5 mm and 2 mm and indeed other wall thickness quartz tubes to be inflatable and indeed tubes of other diameters from the 66 mm example to be inflatable. Further, whilst nominal 6 mm bore 3 and 6 mm outside diameter tube are referred to above, for normal engineering fit reasons, the 0.5 mm clearance prior to inflation will normally be required, typically by boring 0.5 mm oversize and expanding the tube through this clearance. To achieve a 4 mm bore, the initial bore before inflation is smaller than 4 mm.

Figure 4:
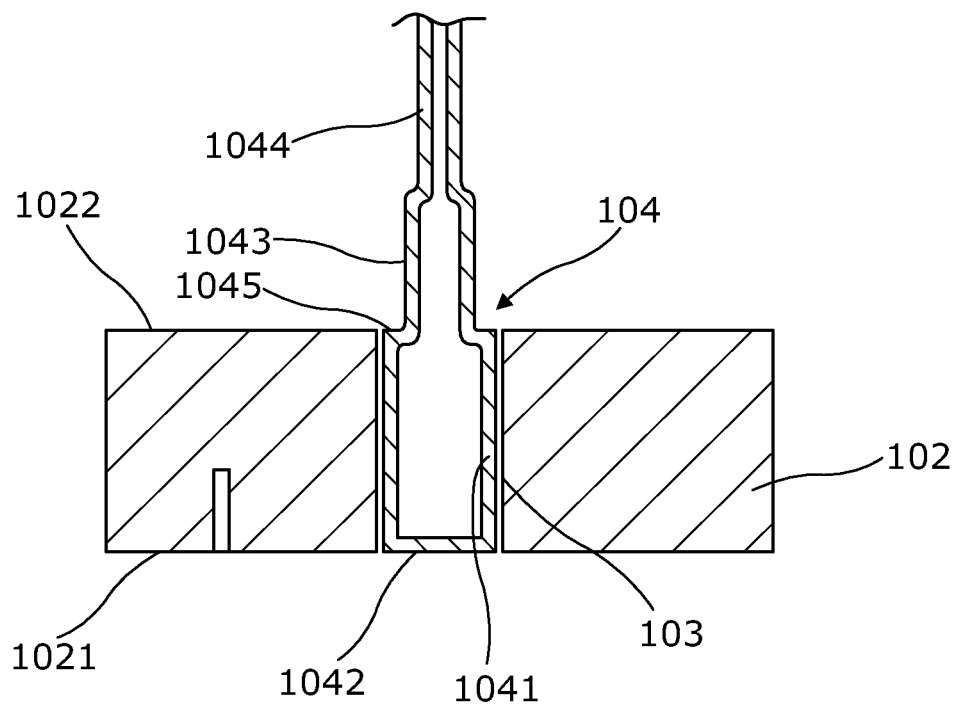
FIG. 4 is a view similar to FIG. 2 of a variant with a stepped tube prior to sealing.
Figure 5:
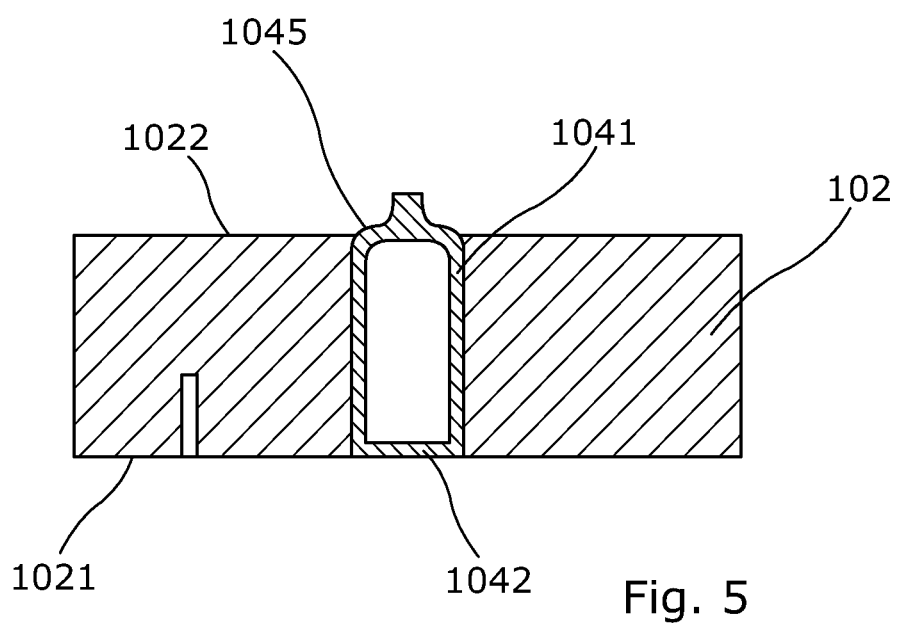
FIG. 5 is a cross-sectional view similar to FIG. 4 of the varied lucent crucible after sealing.

Furthermore, we do not need for the inflated tube to extend beyond the end or the body opposite from the insertion side, and the initially sealed end can be inserted to be flush with side of the body opposite from the insertion side. Such a variant is shown in FIGS. 4 & 5. A quartz body 102 has a central bore 103. A quartz tube 104 worked to capsule form has a large diameter parallel, end portion 1041 with an outside diameter complementary to the bore 103. It is worked to have a flat end 1042, which is flush with one side 1021 of the body in the finished product. It is also worked to have an intermediate diameter portion 1043 and a small diameter portion 044. It can be formed from two or more pieces fused together. The shoulder 1045 between the large diameter and the intermediate diameter portions 1041,1043 is spaced from the flat end by a distance equal to the thickness of the body. Thus on insertion of the heated large diameter portion in the bore 103 and its inflation with its end 1042 flush with the side 1021, the shoulder falls flush with the other surface 1022 of the body. After insertion of the excitable material, driving off of the impurities, and preliminary sealing, the final seal is made at the intermediate portion, leaving a sealed tip proud of the surface 1022.

What is claimed is:

1. A method in the manufacture of a crucible for an LUWPL of, wherein the crucible comprises:
    a waveguide body of lucent material having a bore;
    a tube of lucent material is provided in the bore, the tube:
        being closed at both ends,
        containing the excitable material in a void formed in its bore between its sealed ends and
        being in intimate contact with the lucent material of the body;
    comprising the steps of:
    providing a lucent waveguide body with a bore therein;
    inserting a lucent tube in the bore; and
    causing the tube to expand and/or the body to contract to bring the tube and the body into intimate contact in the bore.

2. A crucible for a LUWPL according to claim 1, wherein the lucent material of the tube will be the same or at least substantially similar to that of the body.

3. A crucible for a LUWPL according to claim 1, wherein the waveguide body and the tube are of fused quartz.

4. A crucible for a LUWPL according to claim 3, wherein the quartz tube is drawn quartz tube.

5. An intermediate product in the manufacture of the crucible of claim 1, the intermediate product comprising:
    a waveguide body of lucent material having a bore and
    a tube of lucent material provided in the bore in intimate contact with the lucent material of the body.

6. A method according to claim 1, wherein the expansion/contraction is effected by heating the body and/or cooling the tube prior to insertion of the tube in the bore.

7. A method according to claim 1, wherein the expansion/contraction is effected with quartz tube by:
    heating the tube to its softening point prior to insertion and inflating it on insertion.

8. A method according to claim 7, wherein the heated tube is inserted into a cool lucent waveguide body.

9. A method according to claim 7 wherein the body is preheated prior to the insertion of the heated tube.

10. A method according to claim 7, wherein the tube is heated whilst being monitored by a thermometer, such as an infra-red detector, whereby the actuator is caused to advance the tube as soon as the tube has reached a temperature at which it is sufficiently soft to be inflatable, yet still sufficiently rigid to be able to be inserted.

11. A method according to claim 1, wherein the distal/insert end of the tube is unsealed on insertion.

12. A method according to claim 1, wherein the distal/insert end of the tube is scaled prior to insertion.

13. A method according to claim 12, wherein the bore is a blind bore and the scaled end of the tube is inserted as far as the bottom of the bore.

14. A method according to claim 12, wherein the bore is a through bore and the distal end is inselied to extend to a determined extent from the side of the body opposite from that at which the tube is inserted into the body.

15. A method according to claim 14, wherein the distal end is inserted through the bore to sufficient extent that, immediately beyond opposite end orifices of the bore outside it, the tube expands to a diameter greater than the bore, where the tube is not constrained by the bore, whereby the tube is physically restrained against axial movement with respect to the body, the tube having been heated along a length exceeding the length of the bore.

16. A method according to claim 12, wherein the bore is a through bore and the distal end is inserted to be flush with the side of the body opposite from that at which the tube is inserted into the body.

17. A method according to claim 13, wherein the distal end is inserted as far as a stop on the side of the body opposite from the insertion side.

18. A method according to claim 14, wherein the stop is a physical stop.

19. A method according to claim 14, wherein the stop is an optical stop used alone nr in addition to a physical stop, a light beam being provided and interrupted by the sealed end when the tube is correctly positioned, with the interruption causing an actuator advancing the tube to stop the advance and cause the application of internal pressure in the tube to inflate it.

20. A method according to claim 1, wherein the tube is of plain uniform diameter.

21. A method according to claim 1, wherein the tube is of stepped having at least a large diameter portion sized complementarily with the bore and a smaller diameter portion for its sealing to enclosed the excitable material.

22. A method according to claim 20, wherein sealing of the proximal end of the tube is effected by glass working techniques, preferably including upsetting and fusing of the material of the tube with the material of the body and upsetting of the sealed distal end into more intimate contact with its side of the body.

23. A method according to claim 13, wherein the proximal end of the tube is sealed in two stages, (i.) remotely from the body first after insertion of the excitable material and (ii.) close to the body thereafter, with the intervening length of tube being removed.

24. A method according to claim 20, wherein after the insertion of the excitable material and prior to the initial sealing:
   the excitable material is caused to sublime and re-condense within the inflated portion of the tube or in the tube in its extent from the body and
   volatile impurity introduced with excitable material is evacuated;
after initial sealing:
   excitable material condensed in the tube outside the body is caused to sublime and re-condensed in the inflated tube inside the body or in the initially sealed end thereof prior to final sealing.

\* \* \* \* \*